Nov. 25, 1924.
R. BERNAT
1,516,516
COMPRESSOR
Filed July 5, 1923  2 Sheets-Sheet 1
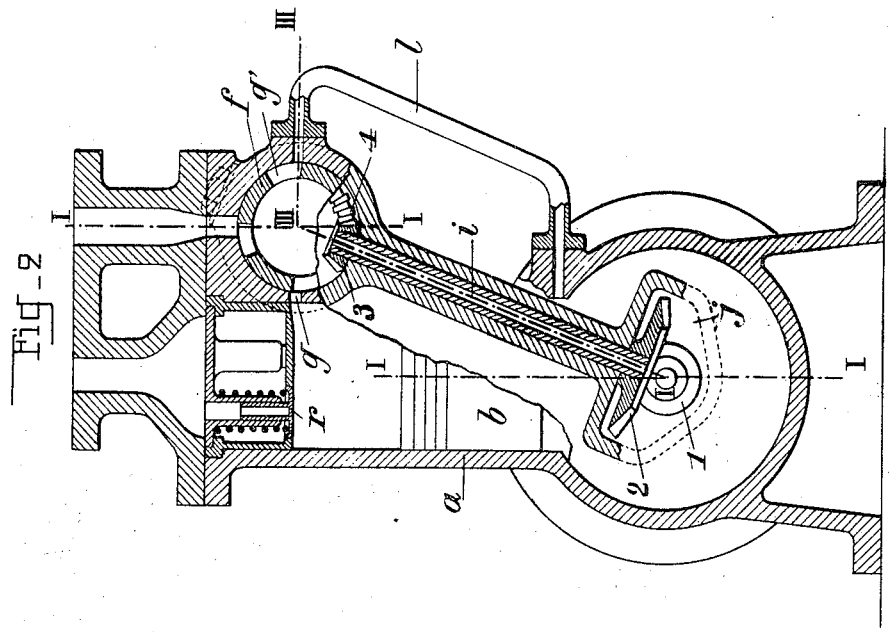
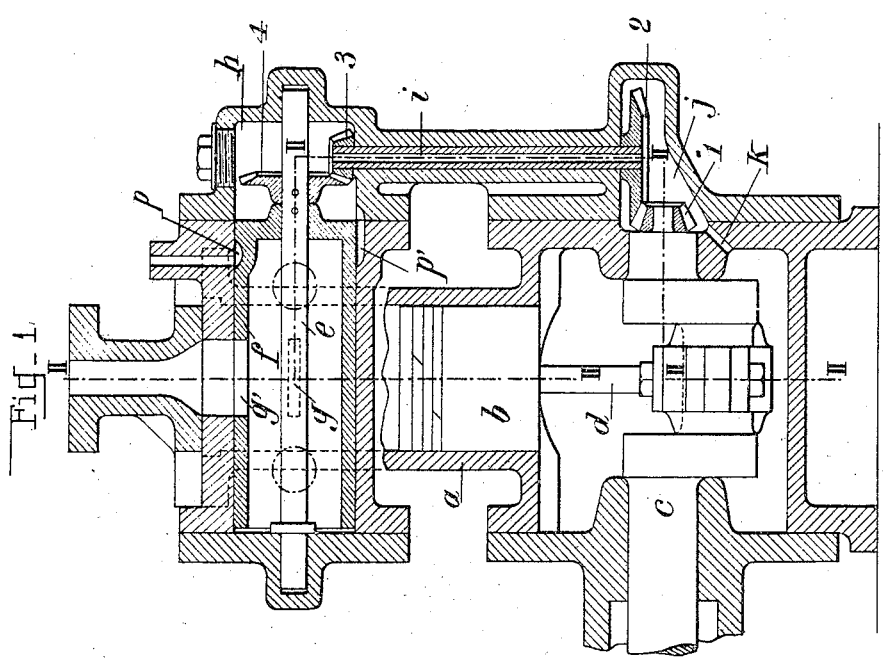
Inventor
R. Bernat
by Langner, Parry, Card & Langner
Attys.

Nov. 25, 1924.
R. BERNAT
1,516,516
COMPRESSOR
Filed July 5, 1923   2 Sheets-Sheet 2
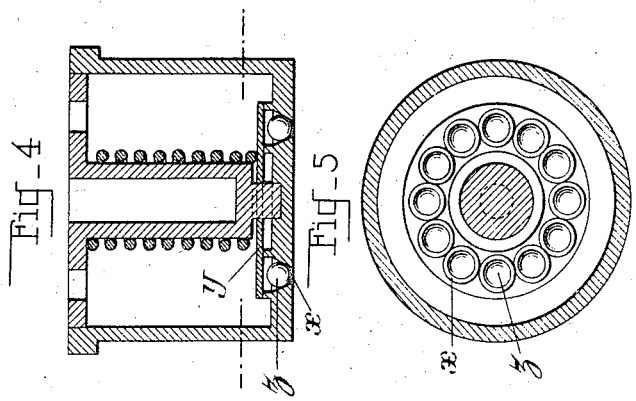
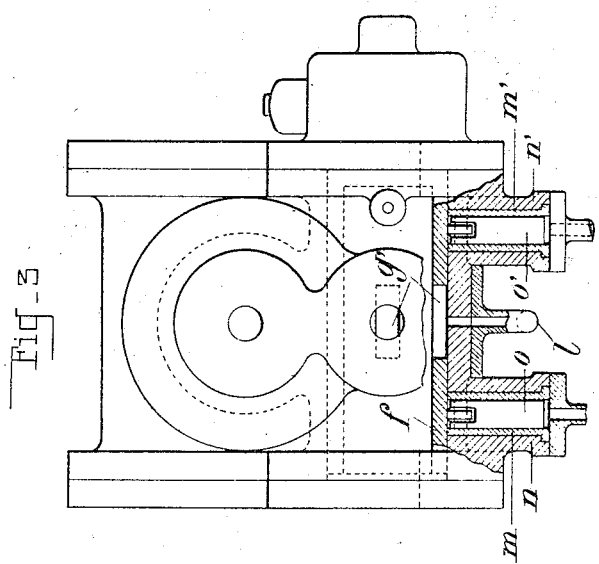
Inventor
R. Bernat
by Langner, Parry, Card & Langner
Att'ys.

Patented Nov. 25, 1924.

1,516,516

UNITED STATES PATENT OFFICE.

RAOUL BERNAT, OF BORDEAUX, FRANCE.

COMPRESSOR.

Application filed July 5, 1923. Serial No. 649,742.

*To all whom it may concern:*

Be it known that I, RAOUL BERNAT, a citizen of the French Republic, residing at Bordeaux, 5-15 Rue de Moscou, Gironde, France, have invented certain new and useful Improvements in and Relating to a Compressor, of which the following is a specification.

Compressors employed up to the present have always been run at a comparatively low speed, owing to the difficulties of filling the cylinders by means of valves, which present themselves when it is desired to attain high speeds.

It is nevertheless of great importance, particularly in compressors used in the manufacture of ice, to construct compressors for very high speeds which can be driven directly by electric motors and permitting, at the same time, as a reduction in space, a considerable economy in the weight of material used in their construction.

The present invention has for its object a compressor for very high speed, in which the inlet valves are avoided and replaced by a rotary sleeve turning preferably at a reduced speed. The compressor can have one or more cylinders, but, in order to make the description clear in the accompanying drawing an example having only one cylinder is shown.

Figure 1 is a vertical section on the line I—I of Fig. 2.

Figure 2 is a section on the line II—II of Figure 1.

Figure 3 is a corresponding view in plan and part section on the line III—III of Figure 2.

Figures 4 and 5 are detailed views in vertical and horizontal section of one modification of the valve box. In Figure 5, the plate $y$ is removed.

The machine comprises a cylinder $a$ in which works the piston $b$ driven by the crank shaft $c$ and the connecting rod $d$. The inlet orifice is represented by $g$. One of the delivery valves is indicated by $r$. The form and disposition of these valves is not of great importance, provided they are light.

The crank shaft carries at one end a gear 1 which, through the intermediary gears 2 and 3, rotates the gear 4 and drives the shaft $e$ which is connected with the cylindrical sleeve $f$. This drive can be carried out by various arrangements; chains, straight, or spiral gears, etc.

The sleeve turns at a speed which, in the construction shown, is a quarter of that of the crank shaft, but which can be equal or a half, a sixth, an eighth, &c., according to the ratio of the gears.

The sleeve $f$ has one, two, four, six, or eight orifices $g'$, according to whether the speed of its rotation is equal to that of the crank shaft or a half, a quarter, a sixth, or an eighth.

In reducing the speed to one quarter, as shown in the drawing, it will be noted that the sleeve turns 300 times for 1,200 of the compressor.

With this arrangement, there is no wear of the sleeve. The chances of seizure are almost entirely avoided and the drive requires very little power. At the same time, it may be remarked that the admission being direct without loss of charge through passage through valves, a much better filling of the cylinder is assured.

In a compressor for high speeds, it is necessary to diminish the clearance space as much as possible. To achieve this object, the delivery valve is arranged as follows: The delivery of gas is assured by multiple orifices $x$ closed by a single valve disc $y$. These orifices are conical and in the interior of each one is placed a ball $z$ which, in the position of rest, is flush with the lower outer surface of the box and is separated from the valve disc by a space of about one millimeter.

With this arrangement, the rise of the balls is limited by that of the valve disc; the clearance space is suppressed and a double closure to delivery is obtained.

It is essential that the sleeve $f$ should be pressed against the orifice $g$ with sufficient force to ensure contact at all times, even after wear, and that it should be equal to the delivery pressure. For this purpose, two plungers $m$, $m'$, preferably with rollers, are placed in sockets $n$, $n'$, and press the sleeve constantly against the orifice $g$. The pressure on the plungers is obtained either by springs of suitable strength, or preferably by pistons $o$, $o'$. To these pistons is led a portion of the oil coming from the oil delivery.

As the total surface of the pistons is slightly greater than that of the orifice $g$, constant pressure of the sleeve against this orifice is obtained even when there is wear of the parts in contact.

The rotatable sleeve $f$ in order to assure proper lubrication, carries a pocket $p$ formed in the outer wall of the sleeve, which pocket at each rotation of the sleeve passes in front of the oil inlet conduit. It thus introduces a constant quantity of oil at each rotation of the sleeve which oil collects in the groove $p'$ and in the chamber $h$ and then descends by the passage $i$ to $j$, and from there passes to the crank case through $k$.

The excess of oil is conducted by the pipe 1 to the casing of the sleeve $f$ in the axis of the ports. Its flow is thus interrupted every time there is a revolution of the piston, and the small dose of oil introduced at each inlet into the cylinder is evacuated on delivery without any disturbance possibly resulting. There is never a great flow of oil and, therefore, no knocking of the connecting rod.

Instead of forming a pocket on the sleeve $f$, there can instead be used for measuring the amount of oil to be introduced, a separate sleeve with a pocket therein, or a valve having a pocket.

Having now particularly described and ascertained the nature of my invention and in what manner the same is to be performed, I declare that what I claim is:

1. A compressor, comprising, in combination, a cylinder, a crank case, a rotatable inlet sleeve positioned to the side of, and perpendicular to, the axis of the cylinder, inlet ports in the cylinder, an outlet valve in the end of the cylinder, an oiling device having means for regulating the quantity of oil introduced into the compressor, means for conducting the introduced oil to the crank case, and means for conducting the oil back from the crank case into the inlet ports, across the sleeve, and into the cylinder.

2. A compressor, comprising, in combination, a cylinder, a crank case, a rotatable sleeve positioned to the side of, and perpendicular to, the axis of the cylinder, inlet ports in the sleeve, a pocket in the sleeve for receiving a measured charge of oil at each rotation, a casing around the sleeve, a groove in the casing communicating with the pocket, a conduit for conducting the charge of oil to the crank case, and a second conduit for conducting the oil from the crank case to the inlet ports.

3. A compressor comprising, in combination, a vertically positioned cylinder, an intake port in the cylinder, a rotatable, horizontally positioned sleeve a casing around the sleeve, a lubricant port in the casing, a port in the casing for a fluid to be compressed, the sleeve simultaneously controlling admission to the cylinder of the fluid to be compressed and of lubricant, the sleeve including a hollow cylinder, and ports therein for registering with the cylinder intake port, the lubricant port, and the port for the fluid to be compressed.

In testimony whereof I have signed my name to this specification.

RAOUL BERNAT.